United States Patent [19]

Davis

[11] 3,923,837
[45] Dec. 2, 1975

[54] EXTRACTION AND RECOVERY OF CINEOLE

[75] Inventor: Curry Beach Davis, Panama City, Fla.

[73] Assignee: American Cyanamid Company, Stamford, Conn.

[22] Filed: Oct. 15, 1974

[21] Appl. No.: 514,725

[52] U.S. Cl. ................... 260/345.2; 260/346.2 R
[51] Int. Cl.² ................................ C07D 311/02
[58] Field of Search .............. 260/346.2 R, 345.2

[56] References Cited
UNITED STATES PATENTS 2,799,717    7/1957    Palmer et al. .................... 260/345.2

OTHER PUBLICATIONS

Matsuhara et al., Chem. Abstract, 71, 3509Z, (1971).
Lombard et al., Bull. Soc. Chim., France, T23, 1564, (1956).
Guenther et al., "The Essential Oils," Vol. 2, pp. 708–712, (1949).

Primary Examiner—James O. Thomas, Jr.
Assistant Examiner—Nicky Chan
Attorney, Agent, or Firm—Harry H. Kline

[57] ABSTRACT

Method of extracting cineole from a terpene fraction containing cineole, by treating the terpene fraction with a strong mineral acid, preferably concentrated sulfuric acid, and thereafter recovering the cineole.

2 Claims, No Drawings

EXTRACTION AND RECOVERY OF CINEOLE

This invention relates to an improved method for refining essential oils and more particularly to such a method for the separation of cineoles from terpenes.

The isolation and purification of cineole from oil of eucalyptus, and from mixtures of cineole and hydrocarbons resulting from certain manufacturing operations, has been accomplished in various ways. Thus, according to one method the cineole may be separated from the terpenes by oxidation of the terpenes to water-soluble compounds with permanganate. By another method the cineole may be isolated through the formation of additive compounds with phosphoric or arsenic acid, ortho-cresol, resorcinol, or α-naphthol. Another method is by treating the cineole-terpene mixture with two liquids which are substantially immiscible one with the other, one being a solvent for the cineole, and the other being a solvent for the terpenes.

This invention has an object the provision of a method for the separation of cineoles from terpenes, whereby both the cineoles and the terpenes can be recovered in substantially pure state and unchanged.

It is a further object of this invention to provide a method for the separation of cineole from terpene by extraction.

A still further object is the provision of a process for separating cineoles from a cineole-terpene mixture in which the cineole and terpenes are separated into different phases by solvent action, thus rendering their separation economically feasible.

The process of my invention is applicable to the separation of both 1,8 and 1,4-cineole, or mixtures thereof, from terpenes, including both aliphatic and alicyclic hydrocarbons, and from terpene mixtures. Examples of terpene-cineole mixtures are such as are obtained in the manufacture of cineole by dehydrating terpene hydrate or by isomerizing terpineol as well as those obtained as by-products of the manufacture of terpene hydrates and pin oil from turpentine. My invention is also applicable to the separation of cineole (eucalyptol) from oil of eucalyptus. The cineole-terpene mixtures to be treated may vary in composition from comparatively small percentages of cineole up to comparatively large percentages of cineole.

The cineoles (1,4-cineole & 1,8-cineole) are difficult to separate from the terpene hydrocarbons, such as dipentene by the normal partitioning techniques. Conditions have now been found where both cineoles are selectively extracted into concentrated acid. The cineoles are recovered from the acid by dilution with water. The conditions used for the extraction are important so as to minimize the acid catalyzed decomposition of both the cineoles and the hydrocarbons.

This invention is useful to recover flavor and fragrance-grade, high-purity cineole from terpene fractions. It is also possible to upgrade terpene fractions, where cineole is a grade-lowering factor, by selectively removing the cineoles without significant acid catalyzed decomposition of the terpene hydrocarbons.

It is known that 1,8-cineole, but not 1,4-cineole or mixtures of the cineoles form solid complexes with phosphoric acid and several phenols. Sulfuric acid has not been effective for the formation of a stable solid complex. It has now been found that under the conditions of the inventive extraction, both the relatively reactive 1,4-cineole and the somewhat more stable 1,8-cineole are dissolved in strong sulfuric acid and recovered after separation with minor amounts of decomposition. Other strong mineral acids may be used, provided they form stable oxonium salts with cineole, such as perchloric acid.

In the process, the cineole concentration in the feed is not critical when the limitation of the acid-to-cineole ratio is observed. The ratio of strong sulfuric acid to cineole that can be used is about 1.25 to 2.5 based on the weight of each. As the concentration of acid is increased, the effective strength of the acid increases and cineole decomposition occurs. At lower extraction ratios, the extraction is incomplete because the acid phase is saturated with the cineoles. The sulfuric acid concentration is from about 60–70%. Fifty percent sulfuric acid will not "solubilize" the cineole ethers. Higher acid concentrations appear to cause cineole decomposition. Acid concentration of 75% or above could not be used because the freezing point of sulfuric acid increases rapidly between 70% and 75% and the acid would freeze. A ratio of 1.9 is optimum with 65% sulfuric acid, therefore because it gives essentially complete recovery of the cineoles without decomposition. The important ratio is the ratio of acid to cineole and not the ratio of acid to feed.

A temperature range of 0° to −20°C. has been found to be the useful temperatures for this process. At temperatures below −20°C., the acid-cineole phase appears to congeal. Above 0°C., cineole decomposition becomes very rapid. It has been further found that the other of adding the acid to the feed is important. The reverse order of addition (cineole feed added to the cold acid) resulted in decomposition.

The following example will serve to illustrate the process.

EXAMPLE

Four hundred grams of a terpene fraction, which contained about 25% 1,4-cineole and 15% 1,8-cineole, were added to a 1000 ml., 3-neck, round-bottom flask fitted with a stop-cock drain. The terpene fraction was cooled to 31 15°C., and 300 g. of 65% sulfuric acid was added dropwise over about 15 minutes. This temperature was maintained at −15°C. during the addition. An acid layer was allowed to separate from a hydrocarbon layer. The acid layer was then drained directly into enough water to dilute the acid to below 30%. Dilution of the acid yielded about 145 g. of cineole (90% yield), which was separated from the acid as the upper layer and washed. The recovered cineoles were typically 85% pure containing minor amounts of terpene hydrocarbons and 2–3% of high boiling terpene alcohols. The crude cineoles thus obtained could be further distilled after washing if desired.

I claim:
1. The method of extracting cineole from a cineole-containing terpene fraction which comprises the steps of: adding to said cineole-containing fraction concentrated sulfuric acid ranging from about 60% to about 70% at a temperature between about −20°C and about 0°C and wherein the ratio of said acid added to cineole ranges between about 1.25 and 2.5, by weight, based on the amount of cineole in the terpene fraction so as to form (a) an acid fraction comprising stable oxonium salt of said cineole and (b) a hydrocarbon terpene fraction, separating resultant oxonium salt fraction from the terpene fraction, treating so-recovered oxonium salt fraction with water to convert said salt to cineole, and thereafter recovering cineole therefrom.
2. The method of claim 1 wherein said acid ratio is about 1.9.